(12) United States Patent
Huang et al.

(10) Patent No.: US 9,485,127 B2
(45) Date of Patent: Nov. 1, 2016

(54) OFDM COMMUNICATIONS

(71) Applicant: Commonwealth Scientific and Industrial Research Organisation, Campbell ACT (AU)

(72) Inventors: Xiaojing Huang, North Ryde (AU); Jian Zhang, Beecroft (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 14/437,022

(22) PCT Filed: Oct. 18, 2012

(86) PCT No.: PCT/AU2012/001270
§ 371 (c)(1),
(2) Date: Apr. 20, 2015

(87) PCT Pub. No.: WO2014/059460
PCT Pub. Date: Apr. 24, 2014

(65) Prior Publication Data
US 2015/0256373 A1    Sep. 10, 2015

(51) Int. Cl.
*H04L 27/26* (2006.01)
*H04L 5/00* (2006.01)
(Continued)

(52) U.S. Cl.
CPC ............... *H04L 27/262* (2013.01); *H04B 1/04* (2013.01); *H04B 1/06* (2013.01); *H04L 5/0066* (2013.01);
(Continued)

(58) Field of Classification Search
CPC ............. H04L 27/262; H04L 27/2628; H04L 27/2618; H04L 5/0066; H04B 1/04; H04B 1/06; H04B 2001/0491; H04W 72/0453
See application file for complete search history.

(56) References Cited

U.S. PATENT DOCUMENTS 8,064,528 B2 * 11/2011 Giannakis ........... H04L 25/0206
375/260
2007/0104283 A1 * 5/2007 Han ..................... H04B 7/0408
375/260

(Continued)

FOREIGN PATENT DOCUMENTS

JP          2010-124416        6/2010
WO          2012/100279        8/2012

OTHER PUBLICATIONS

Xu, R. et al., "A Precoding Scheme for DFT-Based OFDM to Suppress Sidelobes," IEEE Communications Letters, vol. 13, No. 10, Oct. 2009, pp. 776-778 Abstract Only.
(Continued)

*Primary Examiner* — Vineeta Panwalkar
(74) *Attorney, Agent, or Firm* — Wood, Herron & Evans, LLP

(57) ABSTRACT

Disclosed is a wireless transmitter comprising: a module configured to modulate input data bits into data symbols according to a predetermined modulation scheme, and group the data symbols into one or more precoding blocks; at least one symbol insertion module, each configured to insert one or more cancellation symbols into a corresponding precoding block; at least one precoding module, each configured to precode a corresponding precoding block; a subcarrier insertion module configured to concatenate the one or more precoded blocks and to insert at least one cancellation subcarrier into the concatenated precoded blocks to form a precoded OFDM symbol; a module configured to process the precoded OFDM symbol so as to reduce the out-of-band power emitted by the transmitter in transmitting the precoded OFDM symbol, wherein the processing uses the inserted cancellation symbols and cancellation subcarriers; and a module configured to transmit the processed precoded OFDM symbol over a wireless communication channel.

12 Claims, 10 Drawing Sheets

(51) Int. Cl.
*H04B 1/04* (2006.01)
*H04B 1/06* (2006.01)
*H04W 72/04* (2009.01)

(52) U.S. Cl.
CPC ....... *H04L 27/2618* (2013.01); *H04L 27/2628* (2013.01); *H04W 72/0453* (2013.01); *H04B 2001/0491* (2013.01)

(56) References Cited

U.S. PATENT DOCUMENTS

| | | | | |
|---|---|---|---|---|
| 2008/0080421 A1* | 4/2008 | Yu | ........................ | H04B 7/0639 370/329 |
| 2008/0084943 A1* | 4/2008 | Jung | ....................... | H04L 5/023 375/260 |
| 2010/0027688 A1* | 2/2010 | Suh | ....................... | H04B 7/0619 375/260 |
| 2010/0329376 A1* | 12/2010 | Wang | .................. | H04L 27/2626 375/260 |
| 2011/0075743 A1* | 3/2011 | Koike | ................. | H04L 25/0204 375/259 |

OTHER PUBLICATIONS

Australian Patent Office, International Search Report International Application No. PCT/AU2012/001270, Dec. 18, 2012.

* cited by examiner

OFDM COMMUNICATIONS

FIELD

This invention is concerned with wireless communication and in particular with improving the performance of Orthogonal Frequency-Division Multiplexing (OFDM) wireless communication systems.

BACKGROUND

Orthogonal frequency-division multiplexing (OFDM) is a multi-carrier wireless communication technique that offers high spectral efficiency, robustness against multipath propagation and channel fading, and efficient frequency domain channel equalisation. However, there are some disadvantages associated with conventional OFDM transmission, such as high peak-to-average power ratio (PAPR), significant out-of-band emission (OOBE), and sensitivity to sampling frequency offset (SFO), carrier frequency offset (CFO), and phase noise.

A number of techniques have been proposed to overcome or mitigate the above-mentioned disadvantages and improve OFDM transmission performance. For example, to reduce PAPR, techniques of clipping, coding, phase optimization, nonlinear companding, tone reservation and tone injection, constellation shaping, partial transmission sequence and selective mapping, have been proposed. To reduce OOBE, notch filtering, guard band reserving, time-domain windowing, and cancellation using dedicated subcarriers have been proposed. However, the above-mentioned techniques are mostly used independently in conventional OFDM systems to tackle the respective disadvantages of conventional OFDM. Some of the techniques may in fact have conflicting effects. For example, the clipping method for reducing PAPR both introduces in-band distortion and increases OOBE. Notch filtering can reduce OOBE but it can also cause peak regrowth leading to higher PAPR. The effect of any given technique on the communication performance of OFDM as a whole is therefore somewhat equivocal at best.

There is therefore a need for a technique that is able to jointly mitigate at least two of the above mentioned disadvantages and thereby improve OFDM communication performance.

SUMMARY OF INVENTION

In accordance with one aspect of the invention, there is provided a wireless transmitter comprising: a module configured to modulate input data bits into data symbols according to a predetermined modulation scheme, and group the data symbols into one or more precoding blocks; at least one symbol insertion module, each configured to insert one or more cancellation symbols into a corresponding precoding block; at least one precoding module, each configured to precode a corresponding precoding block; a subcarrier insertion module configured to concatenate the one or more precoded blocks and to insert at least one cancellation subcarrier into the concatenated precoded blocks to form a precoded OFDM symbol; a module configured to process the precoded OFDM symbol so as to reduce the out-of-band power emitted by the transmitter in transmitting the precoded OFDM symbol, wherein the processing uses the inserted cancellation symbols and cancellation subcarriers; and a module configured to transmit the processed precoded OFDM symbol over a wireless communication channel.

In accordance with a second aspect of the invention, there is provided a method of transmitting data bits over a wireless communication channel, the method comprising: modulating the data bits into data symbols according to a predetermined modulation scheme; grouping the data symbols into one or more precoding blocks; inserting one or more cancellation symbols into each precoding block; precoding each precoding block; concatenating the one or more precoded blocks and inserting at least one cancellation subcarrier into the concatenated precoded blocks to form a precoded OFDM symbol; processing the precoded OFDM symbol so as to reduce the out-of-band power emitted in transmitting the precoded OFDM symbol, wherein the processing uses the inserted cancellation symbols and cancellation subcarriers; and transmitting the processed precoded OFDM symbol over the wireless communication channel.

In accordance with a third aspect of the invention, there is provided a wireless receiver comprising: a module configured to receive a precoded OFDM symbol over a wireless communication channel; a demultiplexer configured to partition the precoded OFDM symbol into one or more precoded blocks; at least one de-precoding module, each configured to de-precode a corresponding precoded block; a module configured to process the one or more de-precoded blocks so as to compensate for carrier frequency offset and phase noise, wherein the processing uses one or more pilot symbols inserted by the transmitter and one or more corresponding received pilot symbols extracted from the de-precoded blocks; and a module configured to extract data bits from the symbols of the carrier frequency offset- and phase noise-compensated blocks.

In accordance with a fourth aspect of the invention, there is provided a method of receiving data bits transmitted over a wireless communication channel, the method comprising: receiving a precoded OFDM symbol over the wireless communication channel; partitioning the precoded OFDM symbol into one or more precoded blocks; de-precoding each precoded block; processing the one or more de-precoded blocks so as to compensate for carrier frequency offset and phase noise, wherein the processing uses: one or more pilot symbols inserted by a transmitter of the precoded OFDM symbol, and one or more corresponding received pilot symbols extracted from the de-precoded blocks; and extracting the data bits from the symbols of the carrier frequency offset- and phase noise-compensated blocks.

The disclosed embodiments seek to mitigate the above-mentioned disadvantages of OFDM communications by allocating both data domain and frequency domain pilot and cancellation symbols, and using them jointly. The disclosed embodiments include: a transmitter that allocates cancellation subcarriers (CSs) and pilot subcarriers (PSs) in both data domain and frequency domain to facilitate OOBE cancellation, SFO compensation, and residual CFO and phase noise compensation; an OOBE reduction method that makes use of both data domain and frequency domain CSs and allows for precoding to be used for PAPR reduction; and a residual CFO and phase noise compensation method that uses the data domain PSs. A precoded OFDM system making joint use of the disclosed embodiments achieves lower PAPR, lower OOBE, higher spectral efficiency, and more robustness to SFO, CFO, and phase noise than conventional OFDM. The disclosed embodiments can also be individually employed to mitigate the corresponding disadvantages of a conventional OFDM communication system.

BRIEF DESCRIPTION OF DRAWINGS

The embodiments of the invention are described below with reference to the drawings, in which.

DESCRIPTION OF EMBODIMENTS

OFDM is a multi-carrier communication system in which information-bearing data symbols are applied to multiple orthogonal subcarriers. Time domain OFDM symbols are obtained by performing an inverse fast Fourier transform (IFFT) on the data symbols. A precoded OFDM system uses precoding to convert data symbols from the "data domain" to the "frequency domain" before the IFFT, for example in order to reduce PAPR. The precoding can generally be represented as multiplication of a vector of data symbols by a matrix, which can be either a single orthogonal matrix, or comprise multiple orthogonal sub-matrices. For example, each sub-matrix may be a FFT matrix. In this case, the precoded OFDM system becomes an SC-FDMA system as used in the uplink of long term evolution (LTE) mobile networks. The disclosed embodiments are suitable for implementation within such a precoded OFDM system. However, the disclosed embodiments can also be used within a precoded OFDM system using any other precoding matrix. The disclosed embodiments allocate cancellation subcarriers and pilot subcarriers in both the frequency domain and the data domain in order to reduce OOBE and mitigate the performance degradation caused by SFO, residual CFO, and phase noise, while maintaining the low PAPR of the precoded OFDM transmitted signal.

Figure 1:
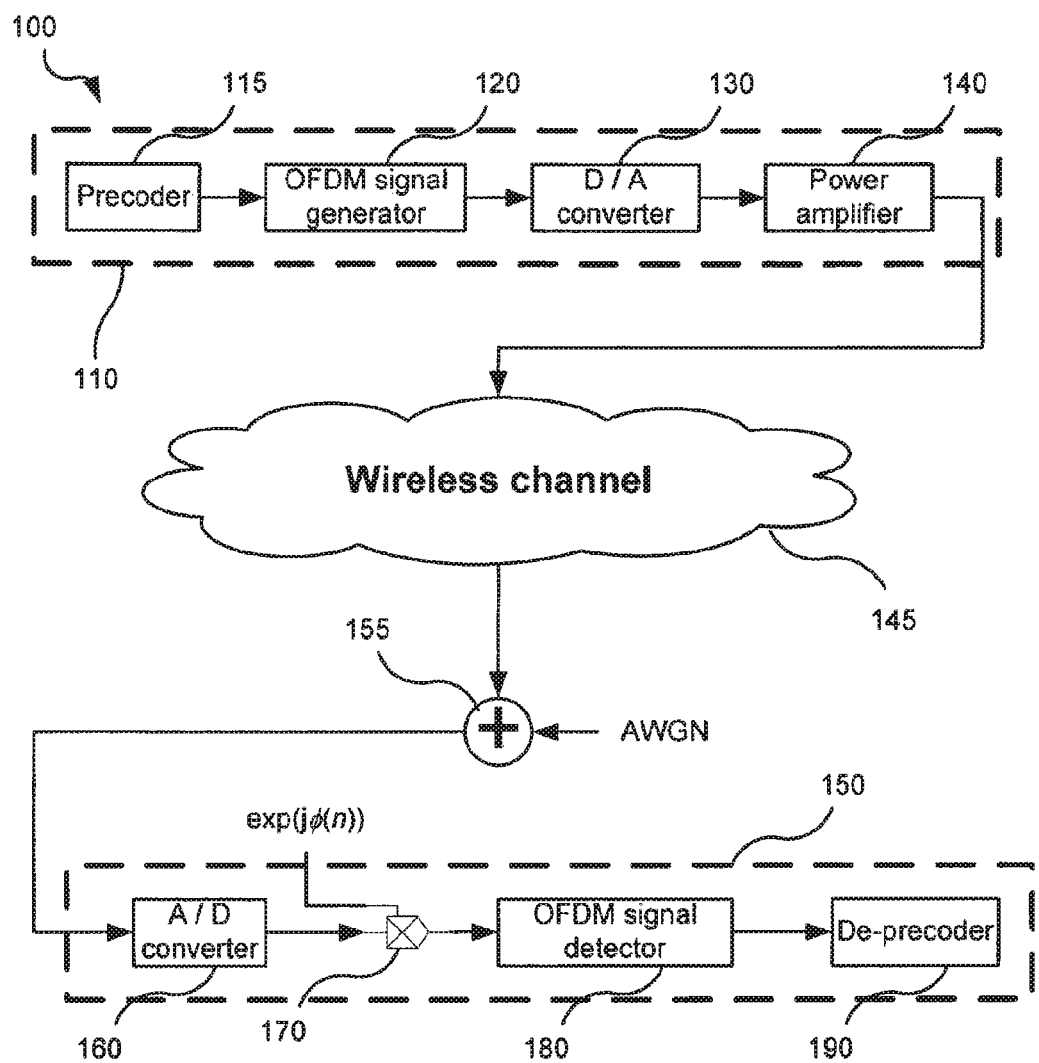
FIG. 1 is a block diagram of a conventional precoded OFDM communication system.

FIG. 1 is a block diagram of a conventional precoded OFDM communication system 100. The system 100 includes only baseband components and omits the radio frequency (RF) components. The system 100 comprises a transmitter 110 that transmits data-bearing signals, a receiver 150 that receives the data-bearing signals, and a wireless channel 145 over which the signals are transmitted. The data to be transmitted via the signals by the transmitter 110 enters a precoder 115 that precodes the data. The input side to the precoder 115 is referred to as the "data domain", while the output side of the precoder 115 is referred to as the "frequency domain". The precoded data symbols are passed through an OFDM signal generator 120 to generate a sequence of OFDM symbols on which the data symbols are modulated. Each OFDM symbol comprises a sequence of time domain samples. The OFDM symbols are then converted to analogue signal waveforms by a digital-to-analogue (D/A) converter 130 with sampling frequency $R_s$. The analogue signal waveforms are converted to RF signals with carrier frequency $f_c$ via frequency up-conversion (not shown) and transmitted, after power amplification by a power amplifier 140, through the wireless channel 145.

The transmitted signals are distorted by the channel 145 and corrupted by additive white Gaussian noise (AWGN), as modelled by the additive process 155. At the receiver 150, the received signals are converted into baseband via frequency down-conversion (not shown) from carrier frequency $f'_c$. The baseband signal is then converted into digital samples by an analogue-to-digital (A/D) converter 160 with sampling frequency $R'_s$. The difference between $R_s$ and $R'_s$, called the sampling frequency offset (SFO), causes further signal distortion. The effects of the difference between $f_c$ and $f'_c$, called carrier frequency offset (CFO), and phase noise introduced at the RF components (not shown) of both the transmitter 110 and the receiver 150 are modelled as a variable phase term $e^{j\phi(n)}$ that is applied to each of the received baseband samples via the multiplier 170. An OFDM signal detector 180 converts the distorted received OFDM symbols back to the frequency domain. A de-precoder 190 then converts the frequency-domain samples back to the data domain, for further processing such as demodulation and decoding (not shown).

Figure 2:
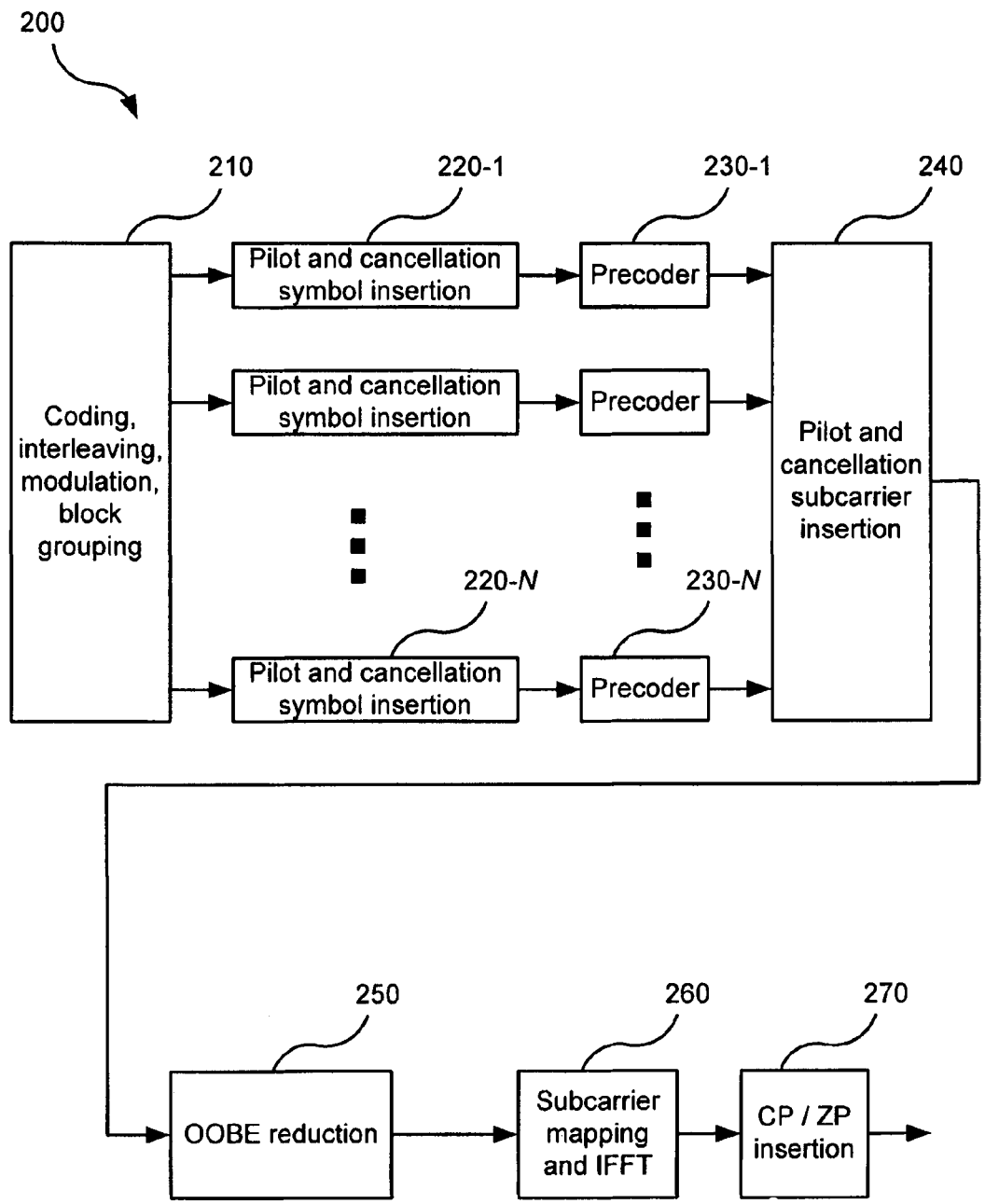
FIG. 2 is a block diagram of a transmitter that may be used in a precoded OFDM communication system according to one embodiment.

FIG. 2 is a block diagram of a transmitter 200 that may be used as the transmitter in a precoded OFDM wireless communication system, such as the precoded OFDM system 100 of FIG. 1, according to one embodiment. The transmitter 200 has some elements in common with the transmitter 110 of FIG. 1. The transmitter 200 includes a module 210 that is configured to code and interleave the input data bits, modulate the data bits into data symbols according to a predetermined modulation scheme (e.g. QPSK), and group the resulting data symbols into (data domain) precoding blocks. Each precoding block is processed by one of N parallel pilot and cancellation symbol insertion modules 220-1, 220-2, ..., 220-N. Each pilot and cancellation symbol insertion module 220-$n$ ($n=1, \ldots, N$) inserts one or more pilot symbols and one or more cancellation symbols into the corresponding precoding block. The pilot symbols can have any non-zero values known to both transmitter and receiver, and in one implementation the cancellation symbols are set with initial values of zeros. In one implementation, the cancellation symbols are inserted at the two ends of the precoding block, and the pilot symbols are equally spaced within each precoding block. After the pilot and cancellation symbols have been inserted in each precoding block by the corresponding pilot and cancellation symbol insertion module 220-$n$, each precoding block comprises three types of symbols, namely cancellation symbols (CSM), pilot symbols (PSM), and data symbols (DSM). The total number of symbols in each precoding block is defined as P.

Figure 3:
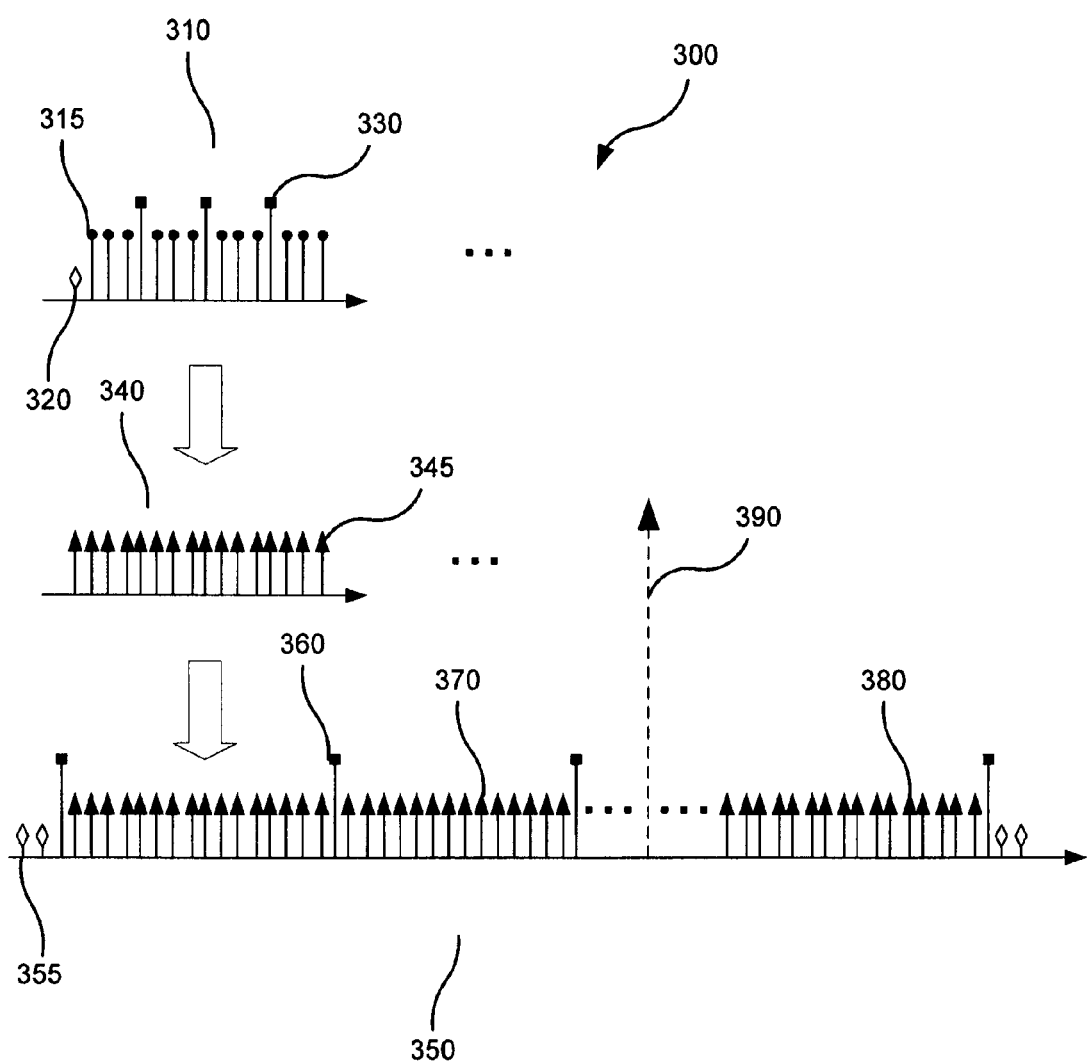
FIG. 3 is an illustration of one example of the operation of the transmitter of FIG. 2.

FIG. 3 is an illustration of one example 300 of the operation of the transmitter 200 of FIG. 2. In the example 300, one (data domain) precoding block 310 contains one CSM 320 at one end of the precoding block 310 and three PSMs, e.g. 330, equally spaced among twelve DSMs, e.g. 315, making up a precoding block containing P=16 symbols. The actual numbers of data domain CSMs and PSMs as well as their locations within a precoding block 310 can vary for different OFDM systems depending on different system design criteria. More CSMs and PSMs can be used for better cancellation and performance improvement, at the cost of reduced spectrum efficiency.

After pilot and cancellation symbol insertion by the corresponding pilot and cancellation symbol insertion module 220-*n*, each precoding block, e.g. 310 in FIG. 3, is precoded by a precoder 230-*n*, to transform the precoding block 310 into a precoded subcarrier block, e.g. 340 in FIG. 3. In one implementation, each precoder, e.g. 230-1, applies an FFT matrix to the corresponding precoding block 310. A precoded subcarrier block 340 comprises frequency domain symbols corresponding to P subcarriers, e.g. 345, in the frequency domain. The pilot and cancellation subcarrier insertion module 240 then concatenates all N parallel precoded subcarrier blocks 340 and inserts at least one pilot subcarrier and at least one cancellation subcarrier to generate a (frequency domain) precoded OFDM symbol, e.g. 350 in FIG. 3. The values of these pilot and cancellation subcarriers are set similarly to the CSMs and PSMs, respectively, in a precoding block 310. The precoded OFDM symbol 350, being a baseband symbol, comprises equal numbers of positive frequency subcarriers, e.g. 380, and negative frequency subcarriers, e.g. 370, symmetrically spaced about zero frequency 390, within the band to be used for OFDM transmission.

After the pilot and cancellation subcarriers have been inserted in the precoded OFDM symbol 350 by the pilot and cancellation subcarrier insertion module 240, the precoded OFDM symbol 350 comprises three types of subcarriers, namely, cancellation subcarriers (CSs), e.g. 355, pilot subcarriers (PSs), e.g. 360, and precoded subcarriers (PRSs) e.g. 370. In the precoded OFDM symbol 350, two CSs, e.g. 355, have been inserted at each end of the band, but the CSs can alternatively be allocated inside the band. In the precoded OFDM symbol 350, one PS 360 is inserted between each precoded subcarrier block 340 of P subcarriers. The actual numbers of frequency domain CSs, PSs, and parallel precoding subcarrier blocks vary for different OFDM systems according to different implementations depending on different system design criteria. Similar to data domain PSMs and CSMs, more CSs and PSs can be used for better cancellation and performance improvement, at the cost of reduced data rate. For example, CSs can be inserted in-between precoded subcarrier blocks in addition to those inserted at each end of the band. More PSs can be also inserted between each precoded subcarrier block instead of only one PS 360 as shown in FIG. 3. In alternative embodiments, each precoded subcarrier block 340 is split into two or more segments and PSs 360 are inserted between these segments.

In the transmitter 200, the precoded OFDM symbol 350 is then processed by an OOBE reduction (OOBER) module 250 so as to reduce the out-of-band power emitted by the transmitter 200 in transmitting the precoded OFDM symbol 350. The processing carried out by the OOBER module 250, which uses the CSs 355 and the CSMs 320, is described in more detail below with reference to FIG. 7. A subcarrier mapping and IFFT module 260 (which may be identified with the OFDM signal generator 120 in the transmitter 110 of FIG. 1) then converts the OOBE-reduced precoded OFDM symbol to the time domain. A CP/ZP insertion module 270 then inserts a cyclic prefix (CP) or a zero padded suffix (ZP) to the time domain OFDM symbol in conventional fashion, before the time domain symbol is converted to RF and transmitted over a wireless communication channel.

Figure 4:
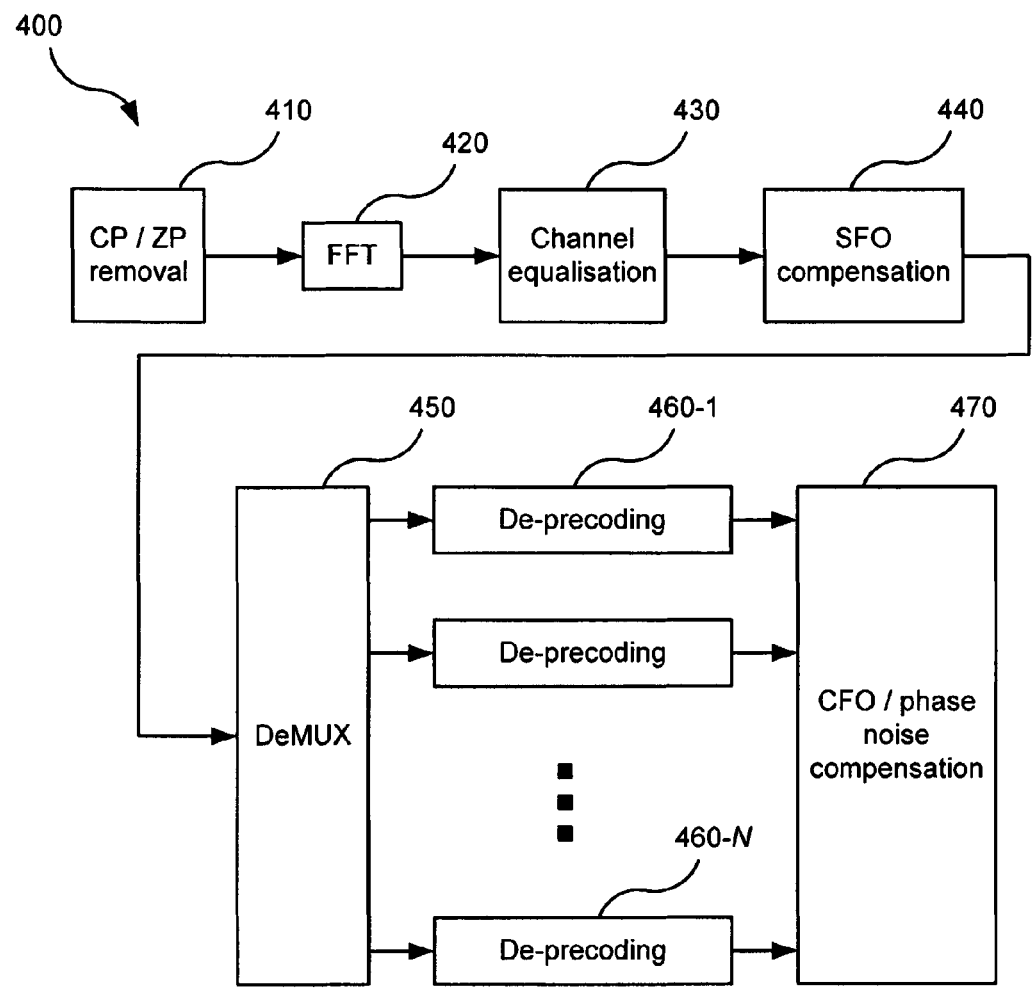
FIG. 4 is a block diagram of a receiver that may be used to complement the transmitter of FIG. 2 in a precoded OFDM communication system according to one embodiment.

FIG. 4 is a block diagram of a receiver 400 that may be used in concert with the transmitter 200 in a precoded OFDM communication system, such as the precoded OFDM system 100 of FIG. 1, according to one embodiment. The receiver 400 has some elements in common with the receiver 150 of FIG. 1. As with the transmitter 200, RF elements are omitted from the receiver 400 in FIG. 4, as are synchronisation and channel estimation, which are performed in conventional fashion. The receiver 400 includes a CP/ZP removal module 410 that removes the cyclic prefix or the zero padded suffix (through overlap-add) from the received baseband time domain OFDM symbol in a manner complementary to the operation of the CP/ZP insertion module 270 in the transmitter 200. Next, coarse CFO estimation and compensation (not shown) may be carried out on the time domain OFDM symbol, for example using an autocorrelation based scheme and training OFDM symbols. Conversion of the time domain OFDM symbol to a precoded (frequency domain) OFDM symbol is then carried out by an FFT module 420, which may be identified with the OFDM signal detector 180 in the receiver 150 of FIG. 1. A channel equalisation module 430 then compensates the precoded OFDM symbol for the distortive effect of the wireless channel using the estimated channel characteristics in the conventional manner.

Figure 5:
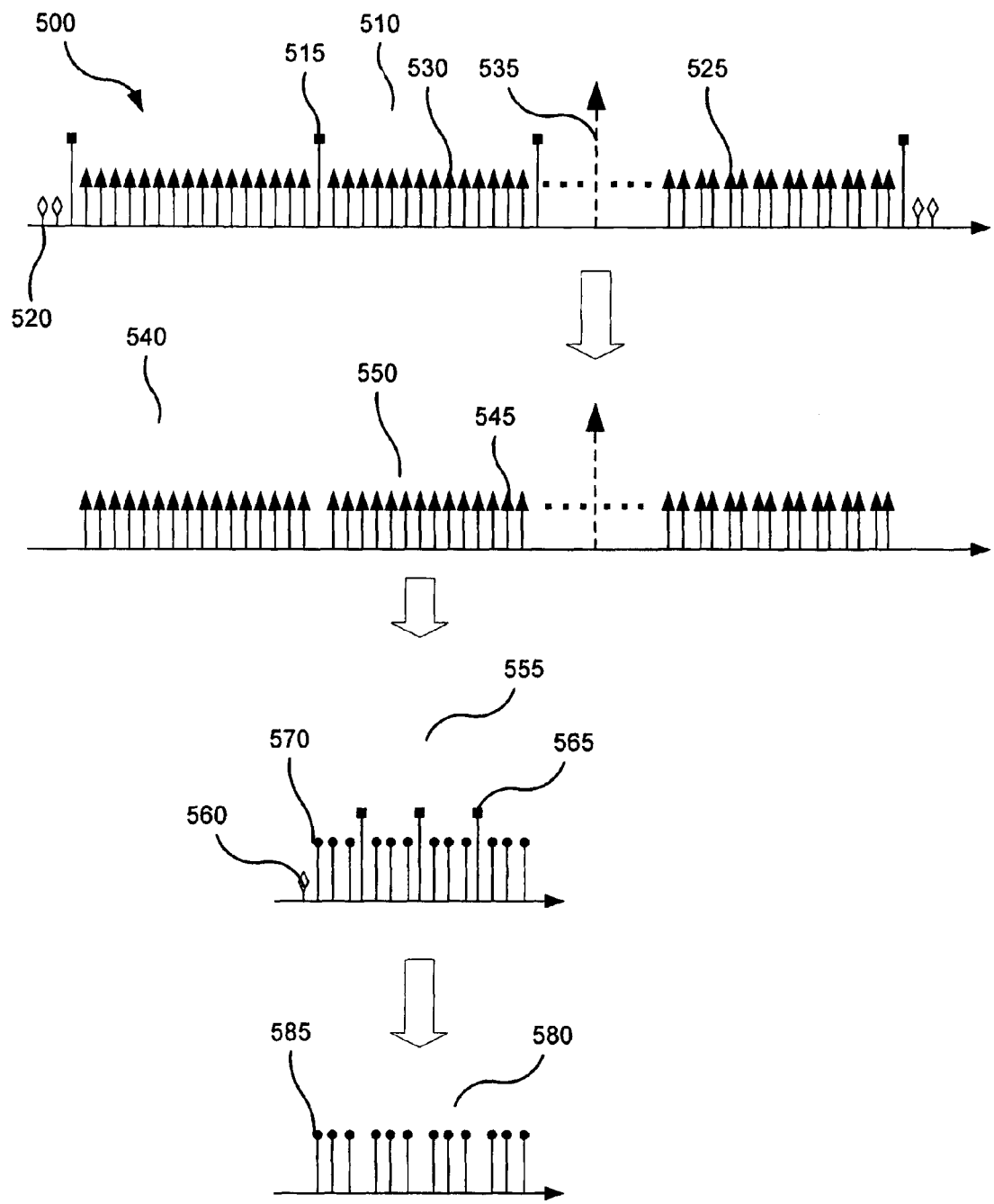
FIG. 5 is an illustration of an example of the operation of the receiver of FIG. 4 on the example illustrated in FIG. 3 of the operation of the transmitter of FIG. 2.

FIG. 5 is an illustration of an example 500 of the operation of the receiver 400 of FIG. 4 on the example 300 illustrated in FIG. 3 of operation of the transmitter 200. The coarse CFO- and channel-compensated precoded OFDM symbol 510, being a baseband symbol, comprises equal numbers of positive frequency subcarriers, e.g. 525, and negative frequency subcarriers, e.g. 530, symmetrically spaced about zero frequency 535 within the band used for OFDM transmission. The coarse CFO- and channel-compensated precoded OFDM symbol 510 comprises three kinds of subcarriers, namely, cancellation subcarriers (CS), e.g. 520, pilot subcarriers (PS), e.g. 515, and precoded subcarriers (PRS) e.g. 525.

An SFO compensation module 440 then compensates the precoded OFDM symbol 510 for SFO using the frequency domain pilot subcarriers, e.g. 515, that were originally inserted by the pilot and cancellation subcarrier insertion module 240 of the transmitter 200. The SFO compensation module 440 assumes the SFO is small and therefore induces a phase shift in the frequency domain subcarriers that varies linearly over the precoded OFDM symbol 510. The SFO-induced linear phase shift may therefore be estimated at, and removed from, all precoded subcarriers 525 by interpolation from the estimated phase shifts at the pilot subcarriers 515.

The SFO-compensated precoded OFDM symbol 540, now comprising only precoded subcarriers (PRS) e.g. 545, is then passed to a demultiplexer 450, which partitions the SFO-compensated precoded OFDM symbol 540 into N parallel precoded blocks, e.g. 550, in a manner that is complementary to the operation of the pilot and cancellation subcarrier insertion module 240 in the transmitter 200. Each precoded block 550 is de-precoded by a corresponding one of N parallel de-precoding modules 460-1, 460-2, . . . , 460-N. The de-precoding is complementary to the precoding carried out by the precoders 230-1, . . . , 230-N in the transmitter 200, e.g. using the IFFT if the precoders 230-1, . . . , 230-N used the FFT, and thereby transforms the precoded blocks 550 from the frequency domain back to the data domain. The de-precoded (data domain) blocks, e.g. 555, comprise three types of symbols, namely cancellation symbols (CSM), e.g. 560, pilot symbols (PSM), e.g. 565, and data symbols (DSM), e.g. 570. The CSMs 560 and PSMs 565 are distributed within the de-precoded blocks 555 in the same manner as the CSMs 320 and PSMs 330 were distributed within the precoding blocks 310 by the pilot and cancellation symbol insertion modules 220-*n*.

A CFO/phase noise compensation module 470 then processes the de-precoded blocks 555 so as to compensate for the residual CFO remaining after the initial, coarse CFO compensation (not shown) carried out at the input to the receiver 400, and for the phase noise introduced at the RF components (not shown) of both the transmitter 200 and the receiver 400, using the data domain PSMs 565 that correspond to the PSMs 330 originally inserted by the pilot and cancellation symbol insertion modules 220-*n*. The processing carried out by the CFO/phase noise compensation module 470 is described in detail below with reference to FIG. 8. The resulting CFO- and phase-noise-compensated block 580 contains only DSMs, e.g. 585, from which the originally transmitted DSMs 315 may be estimated in conventional fashion. The originally transmitted data bits may then be extracted from the estimated transmitted DSMs 315 using the same modulation scheme as that used by the module 210 in the transmitter 200.

Figure 6A:
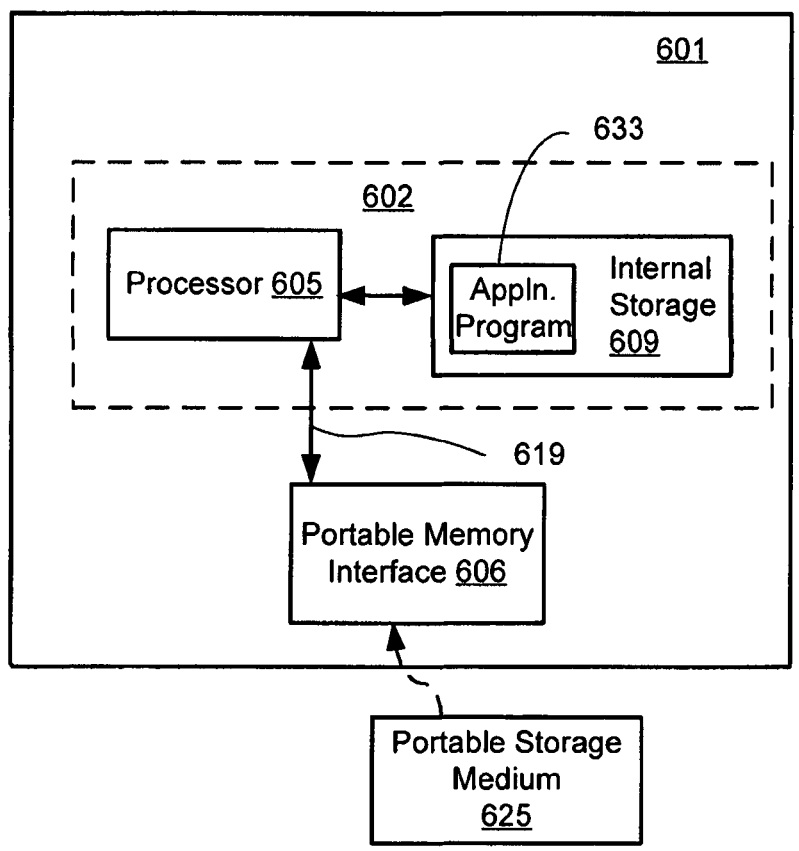
FIGS. 6A and 6B collectively form a schematic block diagram representation of a computing device on which one or more of the modules of the transmitter of FIG. 2 and the receiver of FIG. 4 may be implemented.
Figure 6B:
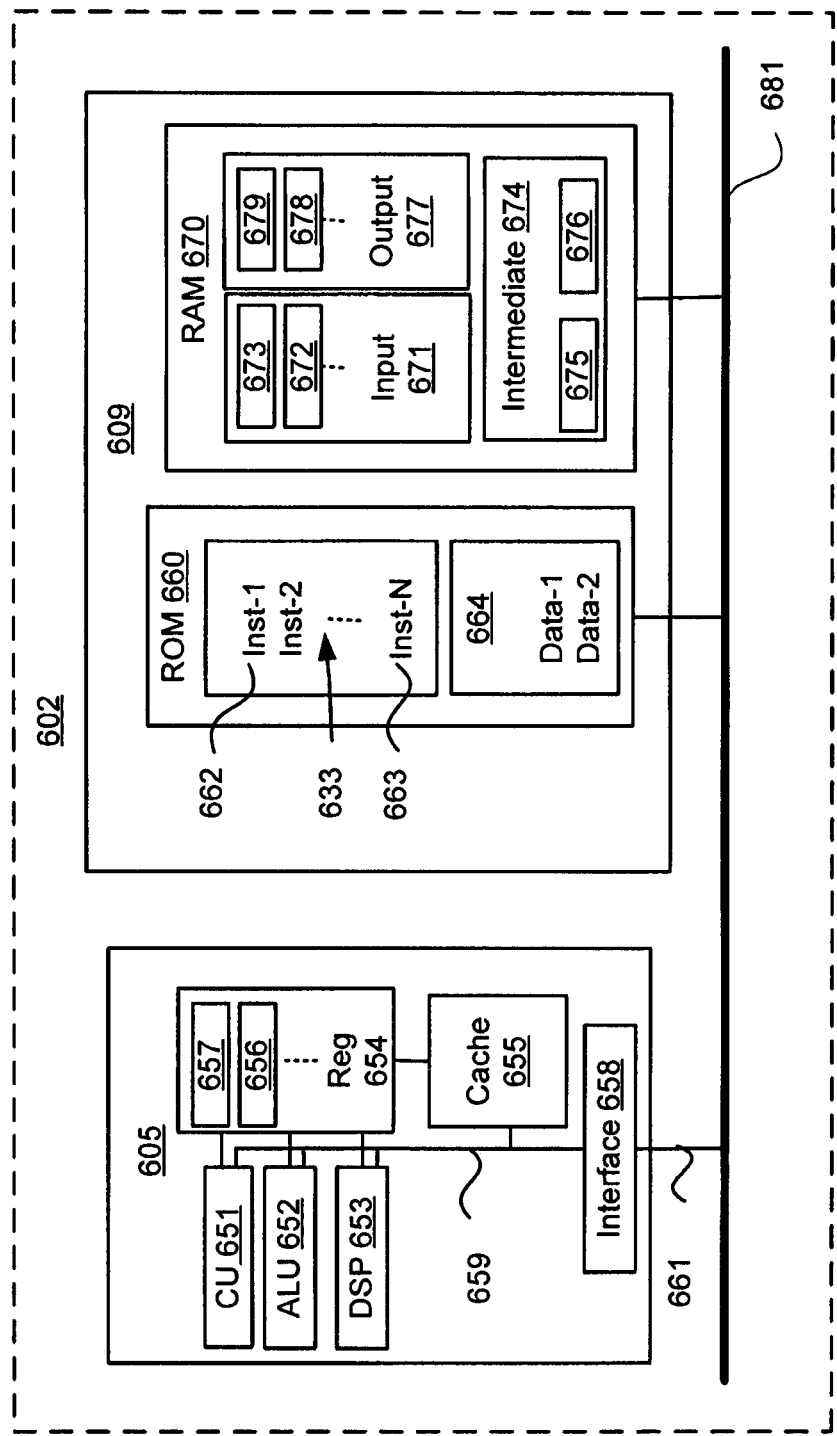

FIGS. 6A and 6B collectively form a schematic block diagram representation of a computing device 601 on which one or more of the modules of the transmitter 200 of FIG. 2 and the receiver 400 of FIG. 4 may be implemented. In particular, the OOBE reduction module 250 of the transmitter 200 and the CFO/phase noise compensation module 470 of the receiver 400 may be implemented using the computing device 601.

As seen in FIG. 6A, the computing device 601 comprises an embedded controller 602. Accordingly, the computing device 601 may be referred to as an "embedded device." In the present example, the controller 602 has a processing unit (or processor) 605 which is bi-directionally coupled to an internal storage module 609. The storage module 609 may be formed from non-volatile semiconductor read only memory (ROM) 660 and semiconductor random access memory (RAM) 670, as seen in FIG. 6B. The RAM 670 may be volatile, non-volatile or a combination of volatile and non-volatile memory.

As seen in FIG. 6A, the computing device 601 also comprises a portable memory interface 606, which is coupled to the processor 605 via a connection 619. The portable memory interface 606 allows a complementary portable computer readable storage medium 625 to be coupled to the computing device 601 to act as a source or destination of data or to supplement the internal storage module 609. Examples of such interfaces permit coupling with portable computer readable storage media such as Universal Serial Bus (USB) memory devices, Secure Digital (SD) cards, Personal Computer Memory Card International Association (PCMIA) cards, optical disks and magnetic disks.

The methods described hereinafter may be implemented using the embedded controller 602, as one or more software programs 633 executable within the embedded controller 602. In particular, with reference to FIG. 6B, the steps of the described methods are effected by instructions in the software 633 that are carried out within the embedded controller 602. The software instructions may be formed as one or more code modules, each for performing one or more particular tasks.

The software 633 of the embedded controller 602 is typically stored in the non-volatile ROM 660 of the internal storage module 609. The software 633 stored in the ROM 660 can be updated when required from a computer readable medium. The software 633 can be loaded into and executed by the processor 605. In some instances, the processor 605 may execute software instructions that are located in RAM 670. Software instructions may be loaded into the RAM 670 by the processor 605 initiating a copy of one or more code modules from ROM 660 into RAM 670. Alternatively, the software instructions of one or more code modules may be pre-installed in a non-volatile region of RAM 670 by a manufacturer. After one or more code modules have been located in RAM 670, the processor 605 may execute software instructions of the one or more code modules.

The program 633 is typically pre-installed and stored in the ROM 660 by a manufacturer, prior to distribution of the computing device 601. However, in some instances, the program 633 may be supplied to the user encoded on the computer readable storage medium 625 and read via the portable memory interface 606 of FIG. 6A prior to storage in the internal storage module 609. Computer readable storage media refers to any non-transitory tangible storage medium that participates in providing instructions and/or data to the embedded controller 602 for execution and/or processing. Examples of such storage media include floppy disks, magnetic tape, CD-ROM, DVD, a hard disk drive, a ROM or integrated circuit, USB memory, a magneto-optical disk, flash memory, or a computer readable card such as a PCMCIA card and the like, whether or not such devices are internal or external of the computing device 601. A computer readable medium having such software or computer program recorded on it is a computer program product.

In another alternative, the software program 633 may be loaded into the embedded controller 602 from other computer readable media. Examples of transitory or non-tangible computer readable transmission media that may also participate in the provision of software programs, instructions and/or data to the computing device 601 include radio or infra-red transmission channels as well as a network connection to another computer or networked device, and the Internet or Intranets including e-mail transmissions and information recorded on Websites and the like.

FIG. 6B illustrates in detail the embedded controller 602 having the processor 605 for executing the programs 633 and the internal storage 609. The internal storage 609 comprises read only memory (ROM) 660 and random access memory (RAM) 670. The processor 605 is able to execute the programs 633 stored in one or both of the connected memories 660 and 670. When the computing device 601 is initially powered up, a system program resident in the ROM 660 is executed. The program 633 permanently stored in the ROM 660 is sometimes referred to as "firmware". Execution of the firmware by the processor 605 may fulfill various functions, including processor management, memory management, device management, storage management and user interface.

The processor 605 typically includes a number of functional modules including a control unit (CU) 651, an arithmetic logic unit (ALU) 652 and a local or internal memory comprising a set of registers 654 which typically contain atomic data elements 656, 657, along with internal buffer or cache memory 655. One or more internal buses 659 interconnect these functional modules. The processor 605 typically also has one or more interfaces 658 for communicating with external devices via system bus 681, using a connection 661.

The program 633 includes a sequence of instructions 662 though 663 that may include conditional branch and loop instructions. The program 633 may also include data, which is used in execution of the program 633. This data may be stored as part of the instruction or in a separate location 664 within the ROM 660 or RAM 670.

In general, the processor 605 is given a set of instructions, which are executed therein. This set of instructions may be organised into blocks, which perform specific tasks or handle specific events that occur in the computing device

601. Typically, the program 633 waits for events and subsequently executes the block of code associated with that event. Events may be triggered in response to sensors and interfaces in the computing device 601.

The execution of a set of the instructions may require numeric variables to be read and modified. Such numeric variables are stored in the RAM 670. The disclosed method uses input variables 671 that are stored in known locations 672, 673 in the memory 670. The input variables 671 are processed to produce output variables 677 that are stored in known locations 678, 679 in the memory 670. Intermediate variables 674 may be stored in additional memory locations in locations 675, 676 of the memory 670. Alternatively, some intermediate variables may only exist in the registers 654 of the processor 605.

The execution of a sequence of instructions is achieved in the processor 605 by repeated application of a fetch-execute cycle. The control unit 651 of the processor 605 maintains a register called the program counter, which contains the address in ROM 660 or RAM 670 of the next instruction to be executed. At the start of the fetch execute cycle, the contents of the memory address indexed by the program counter is loaded into the control unit 651. The instruction thus loaded controls the subsequent operation of the processor 605, causing for example, data to be loaded from ROM memory 660 into processor registers 654, the contents of a register to be arithmetically combined with the contents of another register, the contents of a register to be written to the location stored in another register and soon. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the program 633, and is performed by repeated execution of a fetch-execute cycle in the processor 605 or similar programmatic operation of other independent processor blocks in the computing device 601.

The methods described below may alternatively be implemented in dedicated hardware such as one or more integrated circuits performing the functions or sub functions of the described methods. Such dedicated hardware may include graphic processors, digital signal processors, or one or more microprocessors and associated memories.

The following notation is used in the description of the OOBER module 250 in the transmitter 200 and the CFO/phase noise compensation module 470. A precoded OFDM symbol in the frequency domain, e.g. 350 in FIG. 3, is represented as a column vector $X=[X_{M_1}\ X_{M_1+1}\ \ldots\ X_{M_2}]^T$, in which each entry $X_m$ represents the symbol at a corresponding subcarrier whose index m is between $M_1$ and $M_2$. The total number of subcarriers, and thus the length of the OFDM symbol X, is denoted as $M=M_2-M_1+1$. The power at a given out-of-band frequency indexed by $w_q$ (according to the same indexing scheme as used for the subcarriers) that is emitted by the OFDM transmission of the OFDM symbol X is computed using a "sinc model" as $$p(w_q) = \sum_{m=M_1}^{M_2} \frac{1}{|w_q - m|} X_m \qquad (1)$$

The power emitted at each of Q out-of-band "cancellation points" $w_1, \ldots, w_Q$ as a result of the OFDM transmission of X may therefore be computed by pre-multiplication of X by a Q×M "attenuation matrix" C, where the q-th row of C is $$\left[\frac{1}{|w_q - M_1|}, \frac{1}{|w_q - M_1 - 1|}, \ldots, \frac{1}{|w_q - M_2|}\right] \qquad (2)$$

The OOBER module 250 is configured to reduce the overall out-of-band emission of the OFDM transmitter by forcing to zero the emitted power at each of the Q cancellation points $w_1, \ldots, w_Q$. The OOBER module 250 does this by subtracting from the precoded OFDM symbol X a version of X that has been pre-multiplied by an M×M "OOBER matrix" A, resulting in an OOBE-reduced OFDM symbol Y:

$$Y = X - AX \qquad (3)$$

The OOBER matrix A is defined such that $CY \equiv 0$, i.e. emission at the Q cancellation points $w_1, \ldots, w_Q$ resulting from the OFDM transmission of the OOBE-reduced OFDM symbol Y is identically zero.

To derive the OOBER matrix A, an M×L distribution matrix D is constructed, where L is the total number of CSs and CSMs in both the frequency domain and the data domain per OFDM symbol (in the example 300 of FIG. 3, L is equal to N+4, since there is one data domain CSM 320 in each of N precoding blocks 310, plus two frequency domain CSs 355 at each end of the precoded OFDM symbol 350). Pre-multiplication by the distribution matrix D of an L×1 column vector of "cancellation values" distributes those values among the subcarriers of the precoded OFDM symbol 350. The row index of D corresponds to the subcarrier indices, while the column index of D corresponds to a CS 355 or a CSM 320. The distribution matrix D is constructed from the distribution of CSs 355 and CSMs 320 as determined by the pilot and cancellation symbol insertion modules 220-n and the pilot and cancellation subcarrier insertion module 240 as follows:

For a (frequency domain) CS located at index m, the corresponding column of D has all zeros except for a one at the $(m-M_1+1)$-th row. The corresponding cancellation value is therefore distributed only to the CS. In the example 300 of FIG. 3, for the CS 355 located at the lowest-index subcarrier $M_1$, the corresponding column of D is $[1\ 0\ \ldots\ 0]^T$. The corresponding cancellation value is therefore distributed only to the lowest-index subcarrier $M_1$.

For a (data domain) CSM located at the r-th symbol in a precoding block 310, the corresponding column of D has P non-zero values given by $$e^{j\frac{2\pi rp}{P}},$$

p=0, 1, ..., P−1. These values are assigned to the rows of D corresponding to the P subcarriers at which the corresponding precoded subcarrier block 340 is located within the precoded OFDM symbol 350. The corresponding cancellation value is therefore distributed among all the subcarriers at which the precoded subcarrier block 340 is located within the precoded OFDM symbol 350, with (in general) different phases for each subcarrier. In the example 300 of FIG. 3, the CSM 320 is located at the first symbol (index r=0) in the precoding block 310, which becomes the leftmost precoded subcarrier block 340 in the precoded OFDM symbol 350, with indices $M_1$ to $M_1+P-1$. The corresponding (first) column of the distribution matrix D is therefore $$\left[ \underbrace{1 \ldots 1}_{P} \ 0 \ \ldots \ 0 \right]^T.$$

Once the attenuation matrix C and the distribution matrix D are constructed, the OOBER matrix A may be computed as $$A = D(CD)^+ C \quad (4)$$

where $(B)^+$ indicates taking the pseudo-inverse of a matrix B. The pseudo-inverse of a Q×L matrix B may be computed as follows:

$$(B)^+ = \begin{cases} B^T(BB^T)^{-1}, & Q < L \\ (B^T B)^{-1} B^T, & Q \geq L \end{cases} \quad (5)$$

If Q=L and the matrix CD is invertible, then the pseudo-inverse $(CD)^+$ is equal to the inverse $(CD)^{-1}$ of CD. Using equations (3) and (4), the power emitted at the Q cancellation points $w_1, \ldots, w_Q$ by OFDM transmission of the OOBE-reduced OFDM symbol Y will then be $$CY = CX - CD(CD)^{-1} CX \equiv 0 \quad (6)$$

According to the OOBER equations (3) and (4), the "cancellation values" mentioned above are the elements of the L×1 vector $(CD)^+ CX$. These "cancellation values" are essentially the values that need to be assigned to the CSs and CSMs in order to generate an emitted power at each cancellation point $w_q$ that is the same as the emitted power at that cancellation point generated by the precoded OFDM symbol X. Pre-multiplication of the vector $(CD)^+ CX$ by the distribution matrix D distributes the cancellation values among the subcarriers of the precoded OFDM symbol X. Subtraction of the distributed cancellation values from the values of the precoded OFDM symbol X at those subcarriers, as in equation (3), therefore in principle yields an OOBE-reduced OFDM symbol Y that generates zero emitted power at each of the cancellation points.

In general, the OOBE-reduced OFDM symbol Y differs from the precoded OFDM symbol X at one or more precoded subcarriers 370, potentially affecting the accuracy of data communication. However, the correct operation of the receiver 400 concentrates the differences at the cancellation symbol(s) 560 in the de-precoded block 555, leaving the data symbols 585 in principle equal to the originally transmitted data symbols, e.g. 315. In other words, the OOBE-reduced OFDM symbol Y is equal to the precoded OFDM symbol X that would have been generated by the pilot and cancellation subcarrier insertion module 240 if the negatives of the cancellation values had been assigned to the CSMs 320 by the pilot and cancellation symbol insertion module 220-$n$ and to the CSs 355 by the pilot and cancellation subcarrier insertion module 240.

Figure 7:
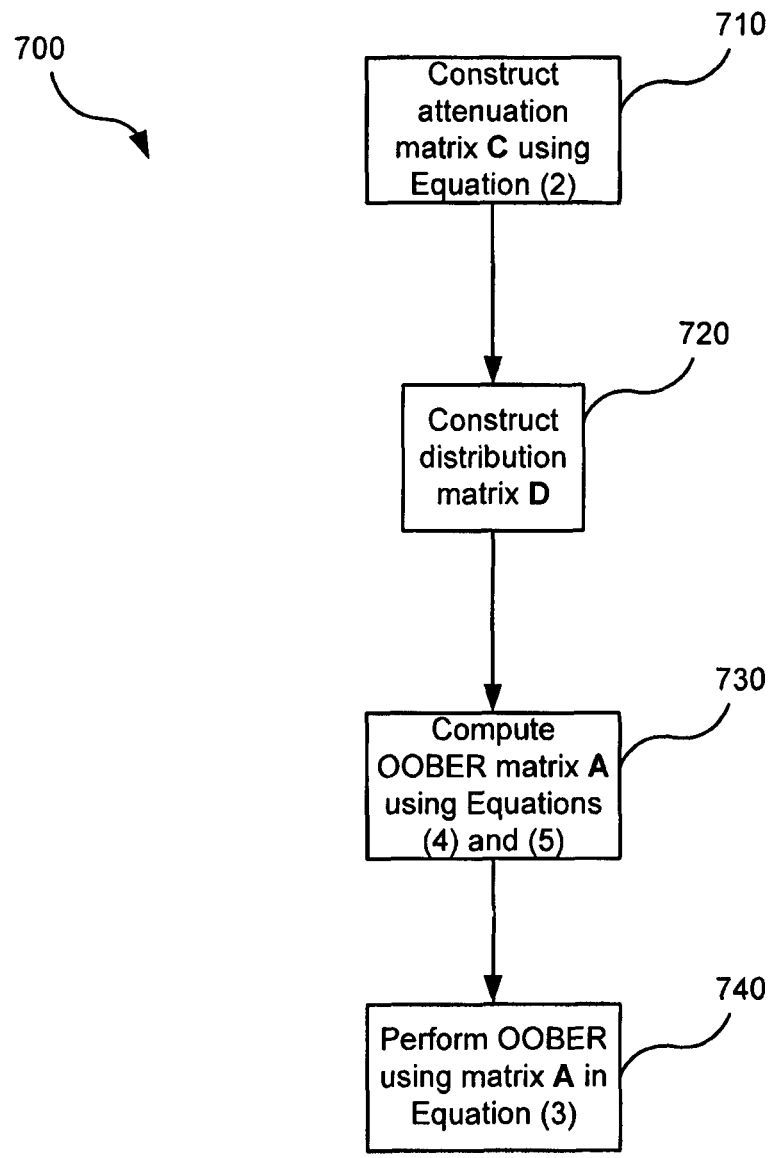
FIG. 7 is a flow chart illustrating a method of OOBE reduction carried out by the OOBE reduction module in the transmitter of FIG. 2.

FIG. 7 is a flow chart illustrating a method 700 of OOBE reduction carried out by the OOBE reduction module 250 in the transmitter 200 of FIG. 2. In the implementation of the OOBE reduction module 250 as the computing device 600 of FIG. 6A, the method 700 is implemented as software executed by the processor 605 as described above.

The method 700 starts at step 710, at which the attenuation matrix C is constructed from the Q cancellation points $w_1, \ldots, w_Q$ using Equation (2). Step 720 follows, at which the distribution matrix D is constructed from the locations of CSMs 330 and CSs 355 within the precoding block 310 and the precoded OFDM symbol 350 as determined by the pilot and cancellation symbol insertion modules 220-$n$ and the pilot and cancellation subcarrier insertion module 240 in accordance with the rules given above.

At the next step 730, the method 700 computes the OOBER matrix A using the matrices C and D according to Equations (4) and (5). Finally, step 740 applies Equation (3) to compute the OOBE-reduced OFDM symbol Y from the precoded OFDM symbol X and the OOBER matrix A. The method 700 then concludes.

The OOBE reduction method 700 implements a "generalised" OOBE reduction scheme in the sense that conventional OOBE reduction techniques may be implemented as special cases of the OOBE reduction method 700.

Two such conventional techniques result when $M_1=0$ and $M_2=M-1$, and the cancellation points $w_1, \ldots, w_Q$ are chosen as $-2$ and $M+1$ (so Q=2). If there are two cancellation subcarriers 355 located at subcarriers 0 and M−1, and no cancellation symbols 320, so L=2, the distribution matrix D is $$\begin{bmatrix} 1 & 0 & \ldots & 0 \\ 0 & \ldots & 0 & 1 \end{bmatrix}^T$$

and the method 700 becomes the conventional cancellation carrier (CC) method. If N=1, and there are no cancellation subcarriers 355, just a single cancellation symbol 320 at the first symbol (index r=0) in the (only) precoding block 310, i.e. L=1, the distribution matrix D is $[1 \ 1 \ \ldots \ 1]^T$, and the method 700 becomes the conventional sidelobe self-cancellation method for SC-FDMA.

In another example, the cancellation points $w_1, \ldots, w_Q$ are chosen as −2 and M+1 (so Q=2), as above. A precoded subcarrier block 340 is allocated to precoded subcarriers 370 indexed from 2 to M−3 within the precoded OFDM symbol 350, so N=1 and P=M−4. Two frequency domain PSs 360 are allocated to subcarriers 1 and M−2. Two frequency domain CSs 355 are allocated to subcarriers 0 and M−1, and one CSM 320 is allocated to the first symbol (r=0) of the (only) precoding block 310, so L=3. The distribution matrix D is $$D = \begin{bmatrix} 1 & 0 & 0 & \ldots & 0 & 0 & 0 \\ 0 & 0 & 1 & \ldots & 1 & 0 & 0 \\ 0 & 0 & 0 & \ldots & 0 & 0 & 1 \end{bmatrix}^T.$$

The first and third cancellation values therefore contribute only to the two frequency domain CSs 355, which are otherwise unaffected by the OOBE reduction. The second cancellation value affects all M−4 data subcarriers 370 from 2 to M−3. The PSs 360 corresponding to the "zero rows" 2 and M−1 of D are unaffected by OOBE reduction.

The OOBE reduction using both data domain CSMs and frequency domain CSs has better performance than that obtainable using either data domain CSMs or frequency domain CSs alone. For example, with the method using data domain CSMs alone (such as the conventional sidelobe self-cancellation method for SC-FDMA), the OOBE near the edges of the signal spectrum cannot be sufficiently reduced. With the method using frequency domain CSs alone (such as the conventional cancellation carrier method), the extra power consumed on a CS is usually required to be significantly higher than the average power on a data subcarrier. The CC method also causes PAPR regrowth.

Note that if in step 720 the distribution matrix D is set to $C^T$, rather than constructed as described above, then Q=L, and the matrix CD is invertible, so the pseudo-inverse $(CD)^+$ is equal to the inverse $(CD)^{-1}$ of CD. The method 700 then becomes the conventional Sidelobe Suppression with Orthogonal Projection (SSOP) method.

To describe the method of residual CFO and phase noise compensation carried out by the CFO/phase noise compensation module 470 in the receiver 400 of FIG. 4, a simplified signal model, assuming perfect channel equalisation and no AWGN, will be used so as to focus on the effect of residual CFO and phase noise.

As before, let the column vector $X=[X_{M_1} X_{M_1+1} \ldots X_{M_2}]^T$ denote the frequency domain precoded OFDM symbol 350 at the transmitter 200. Let $\hat{X}=[\hat{X}_{M_1} \hat{X}_{M_1+1} \ldots \hat{X}_{M_2}]^T$ denote the SFO-compensated precoded OFDM symbol 540 at the receiver 400. Denote the phase term caused by the residual CFO and phase noise in the time domain as $e^{j\phi_0(n)}$, where n is a time domain index (n=0, 1, . . . , M−1). The simplified signal model is then written as $$\hat{X} = F_M \begin{pmatrix} e^{j\phi_0(0)} & 0 & \ldots & 0 \\ 0 & e^{j\phi_0(1)} & \ldots & 0 \\ \vdots & \vdots & \ddots & \vdots \\ 0 & 0 & \ldots & e^{j\phi_0(M-1)} \end{pmatrix} F_M^{-1} X \quad (7)$$

where $$F_M = \frac{1}{\sqrt{M}} \left( e^{-j\frac{2\pi}{M}km} \right)_{M \times M} \text{ and } F_M^{-1} = \frac{1}{\sqrt{M}} \left( e^{j\frac{2\pi}{M}mk} \right)_{M \times M}$$

are the M-point FFT and M-point IFFT matrices respectively. According to the simplified signal model in Equation (7), the only difference between the transmitted symbols and the received symbols (after equalization, coarse CFO and SFO compensation) is the residual CFO and phase noise term $e^{j\phi_0(n)}$.

Denote the column vector of symbols in a precoding block 310 at the transmitter 200 as $d=[d_{P_1} d_{P_1+1} \ldots d_{P_2}]^T$, where $P=P_2-P_1+1$. Assuming precoding is implemented by the FFT, the vector d is related to the precoded (frequency domain) subcarrier block 340 at the transmitter 200 by $$\begin{bmatrix} X_{P_1} \\ X_{P_1+1} \\ \vdots \\ X_{P_2} \end{bmatrix} = F_P d \quad (8)$$

where $F_P$ is the P-point FFT matrix as defined previously. De-precoding of the precoded block 550 (comprising symbols from $\hat{X}_{P_1}$ to $\hat{X}_{P_2}$) at the receiver 400 to the de-precoded block 555 denoted as $\hat{d}=[\hat{d}_{P_1} \hat{d}_{P_1+1} \ldots \hat{d}_{P_2}]^T$ may be written as $$\hat{d} = F_P^{-1} \begin{bmatrix} \hat{X}_{P_1} \\ \hat{X}_{P_1+1} \\ \vdots \\ \hat{X}_{P_2} \end{bmatrix} \quad (9)$$

where $F_P^{-1}$ is the P-point IFFT matrix as defined previously.

Ignoring the small interference from both other subcarriers outside the current precoded block 550 and other PRSs in the precoded block 550, and using Equations (7) to (9), the relationship between $\hat{d}_{P_1+p}$ and $d_{P_1+p}$ for p=0, 1, . . . , P−1 can be derived as $$\hat{d}_{P_1+p} \approx \left[ \frac{1}{PN} \sum_{n=0}^{N-1} \left( \frac{\sin\pi\left(p - \frac{P}{N}n\right)}{\sin\frac{\pi}{P}\left(p - \frac{P}{N}n\right)} \right)^2 e^{j\varphi_0(n)} \right] d_{P_1+p} \approx e^{j\tilde{\varphi}_0(p)} d_{P_1+p} \quad (10)$$

Equation (10) shows that a data domain symbol $\hat{d}_{P_1+p}$ is affected by a phase error term $e^{j\tilde{\phi}_0(p)}$, which can be regarded as a weighted average of the residual CFO and phase noise terms $e^{j\phi_0(n)}$, where the weighting is by a discrete squared sinc function. If the phase error term $e^{j\tilde{\phi}_0(p)}$ can be estimated from the known values of the transmitted and received (data domain) PSMs (330 and 565 respectively), then the residual CFO and phase noise in the de-precoded symbols $\hat{d}_{P_1+p}$ can be compensated for by multiplication by the reciprocal of the estimated phase error term.

PSMs 565 from multiple consecutive de-precoded blocks surrounding the current de-precoded block 555 can be used to obtain a better estimate of the phase error term $e^{j\tilde{\phi}_0(p)}$ than is obtainable from the current de-precoded block 555 alone. Denote the R PSMs 330 in the u-th of U precoding blocks 310 as $S_i^u$, for i=1, . . . , R, and their indices within each precoding block 310 as $r_1, r_2, \ldots, r_R$. The corresponding received PSMs 565 extracted from the corresponding U de-precoded blocks 555 are denoted as $\hat{S}_i^u$. Equation (10) relates the phase of each received PSM $\hat{S}_i^u$ to the phase of the corresponding transmitted PSM $S_i^u$. The argument of the conjugate product $\hat{S}_i^u(S_i^u)^*$ is equal to the phase difference between the received PSM $\hat{S}_i^u$ and the corresponding transmitted PSM $S_i^u$. An average conjugate product of $S_i^u$ and $\hat{S}_i^u$ at the $r_i$-th symbol over the U consecutive de-precoded blocks 555 may be computed as $$G_i = \sum_{u=1}^{U} \hat{S}_i^u (S_i^u)^* \quad (11)$$

The argument of the average conjugate product $G_i$ gives an estimate $\tilde{\phi}_0(r_i)$ of the phase error at the $r_i$-th symbol of the current de-precoded block 555. The phase error $\tilde{\phi}_0(p)$ at the p-th symbol of the current de-precoded block 555 may then be estimated by interpolation from the phase error estimates $\tilde{\phi}_0(r_i)$. Finally, the received DSMs $\hat{d}_{P_1+p}$ may be compensated for the estimated residual CFO and phase noise $\tilde{\phi}_0(p)$ by subtracting $\tilde{\phi}_0(p)$ from the phase of $\hat{d}_{P_1+p}$, or equivalently multiplying $\hat{d}_{P_1+p}$ by $e^{-j\tilde{\phi}_0(p)}$. The result is a CFO- and phase-noise-compensated data domain block 580 comprising residual CFO and phase noise-compensated DSMs 585.

Figure 8:
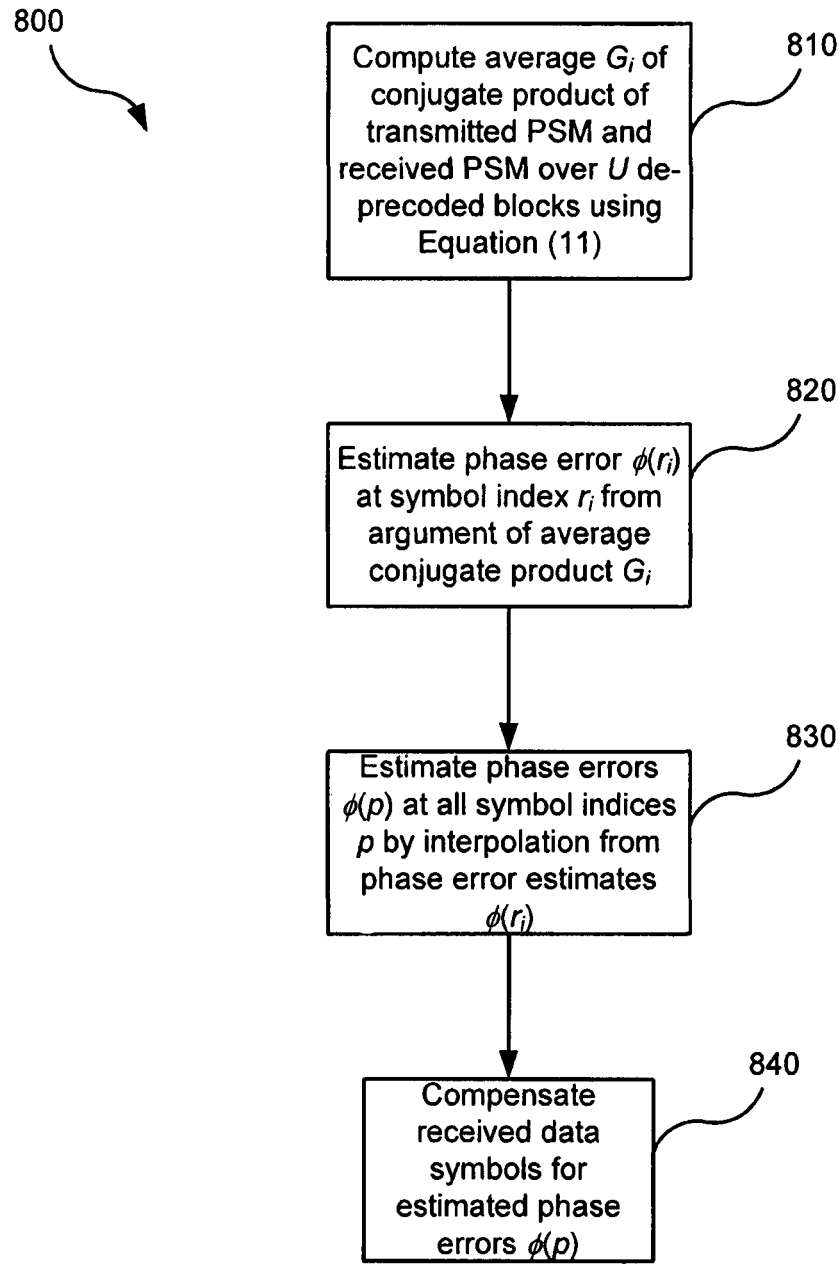
FIG. 8 is a flow chart illustrating a method of residual CFO and phase noise compensation carried out by the CFO/phase noise compensation module in the receiver of FIG. 4.

FIG. 8 is a flow chart illustrating a method 800 of residual CFO and phase noise compensation carried out by the CFO/phase noise compensation module 470 in the receiver 400 of FIG. 4. In the implementation of the CFO/phase noise compensation module 470 as the computing device 600 of FIG. 6A, the method 800 is implemented as software executed by the processor 605 as described above.

The method 800 starts at step 810, which computes the average conjugate product $G_i$ of the transmitted and received PSMs $S_i^u$ and $\hat{S}_i^u$ at the $r_i$-th symbol over U consecutive de-precoded blocks surrounding the current de-precoded block 555 using Equation (11). Step 820 follows, at which the processor 605 computes an estimate $\tilde{\phi}_0(r_i)$ of the phase error at the $r_i$-th symbol of the current de-precoded block 555 as the argument of the average conjugate product $G_i$, for all i=1, . . . , R. The method 800 then proceeds to step 830, which forms estimates $\tilde{\phi}_0(p)$ of the residual CFO and phase noise at the p-th symbol of the current de-precoded block 555 by interpolation from the estimates $\tilde{\phi}_0(r_i)$ at the PSM indices $r_1, r_2, \ldots, r_R$. In one implementation, bilinear interpolation is used, but other conventional interpolation methods such as bicubic interpolation may also be used at step 830. This interpolation is assisted by an even distribution of PSMs 330 within the precoding blocks 310. Finally, step 840 compensates for the estimated residual CFO and phase noise at the p-th symbol of the current data domain block 555, e.g. by subtracting from the phase of each received DSM $\hat{d}_{P_1+p}$ the estimated phase error $\tilde{\phi}_0(p)$ at the corresponding symbol index p. The result of step 840 is residual CFO and phase noise-compensated DSMs 585 making up a current CFO- and phase-noise-compensated block 580. The method 800 then concludes.

In alternative implementations, different averaging schemes over the U data domain blocks 310 are used in place of Equation (11).

In an alternative embodiment, the transmitter 200 may be used in combination with a de-precoding receiver 400 without the CFO and phase noise compensation module 470. In such an embodiment, the transmitter 200 need not insert PSMs 330 into the precoding blocks 310.

In a further alternative embodiment, the receiver 400 may be used in combination with a precoding transmitter 200 without the OOBER module 250. In such an embodiment, the transmitter 200 need not insert CSMs 320 into the precoding blocks 310, nor CSs 355 into the precoded OFDM symbol 350.

Figure 9:
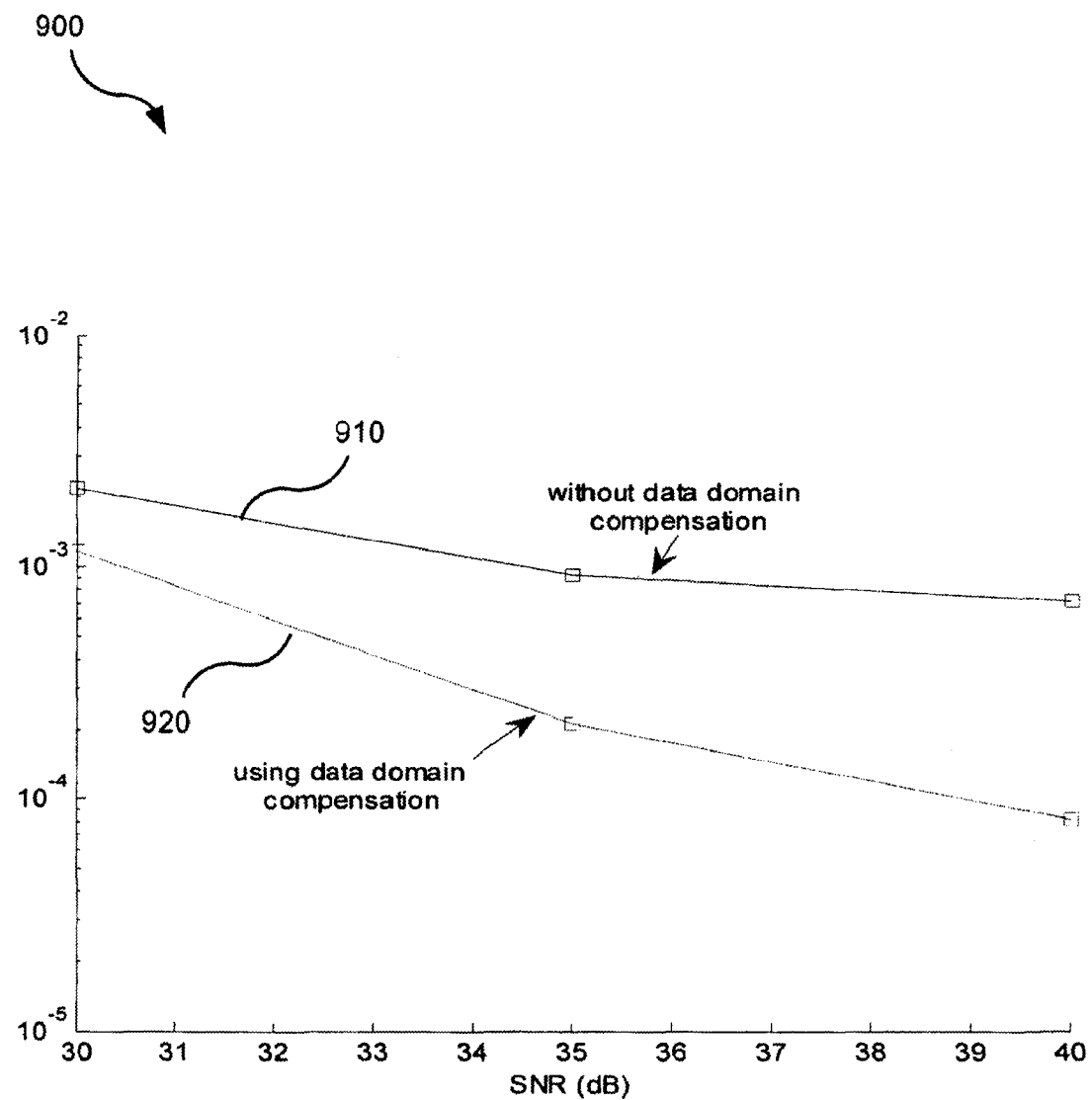
FIG. 9 contains a graph showing the bit error performance of a precoded OFDM system comprising the transmitter of FIG. 2 and the receiver of FIG. 4 with and without the CFO/phase noise compensation module.

FIG. 9 contains a graph 900 showing the bit error performance of a simulated precoded OFDM system comprising the transmitter 200 and the receiver 400 with and without the CFO/phase noise compensation module 470. The simulated system has N=8 precoding blocks, a total number of subcarriers 512 (so P=64), 2 pilot symbols with indices 1 and 17 in each precoding block, and 4 pilot subcarriers with indexes 66, 131, 383 and 448. The simulated wireless channel is a Rayleigh fading channel of 16 independent multipaths. The graph 900 contains two traces: an upper trace 910 that shows bit error rate as a function of signal to noise ratio (SNR) of the system without the CFO/phase noise compensation module 470; and a lower trace 920 that shows bit error rate as a function of signal to noise ratio (SNR) of the system with the CFO/phase noise compensation module 470. According to the graph 900, a greater than 5 dB performance improvement may be obtained from the use of the CFO/phase noise compensation module 470.

The invention claimed is:

1. A wireless transmitter comprising:
   a. a module configured to modulate input data bits into data symbols according to a predetermined modulation scheme, and group the data symbols into one or more precoding blocks;
   b. at least one symbol insertion module, each configured to insert one or more cancellation symbols into a corresponding precoding block;
   c. at least one precoding module, each configured to precode a corresponding precoding block;
   d. a subcarrier insertion modcule configured to concatenate the one or more precoded blocks and to insert at leat one cancellation subcarrier into the concatenated precoded blocks to form a precoded Orthogonal Frequency Division Multiplexing (OFDM) symbol;
   e. a module configured to process the precoded OFDM symbol so as to reduce the out-of-band power emitted by the transmitter in transmitting the precoded OFDM symbol, wherein the processing uses the inserted cancellation symbols and cancellation subcarriers; and
   f. a module configured to transmit the processed precoded OFDM symbol over a wireless communication channel.

2. A transmitter as claimed in claim 1, wherein the module configured to process the precoded OFDM symbol is configured to:
   a. construct an attenuation matrix from one or more out-of-band frequencies at which the emitted power is to be forced to zero;
   b. construct a distribution matrix from the locations of the cancellation symbols and the cancellation subcarriers within the precoded blocks and the precoded OFDM symbol respectively;
   c. compute an out-of-band emission reduction matrix from the attenuation matrix and the distribution matrix; and
   d. subtract the product of the out-of-band emission reduction matrix and the precoded OFDM symbol from the precoded OFDM symbol.

3. A transmitter as claimed in claim 2, wherein the out-of-band emission reduction matrix is the product of the distribution matrix, the pseudo-inverse of the product of the attenuation matrix and the distribution matrix, and the attenuation matrix.

4. A transmitter as claimed in claim 1, wherein each symbol insertion module is further configured to insert one or more pilot symbols into a corresponding precoding block.

5. A transmitter as claimed in claim 1, wherein the subcarrier insertion module is further configured to insert one or more pilot subcarriers into the precoded OFDM symbol.

6. A transmitter as claimed in claim 1, wherein the precoding modules are configured to precode the respective precoding blocks using the Fast Fourier Transform.

7. A method of transmitting data bits over a wireless communication channel, the method comprising:
   a. modulating the data bits into data symbols according to a predetermined modulation scheme;
   b. grouping the data symbols into one or more precoding blocks;
   c. inserting one or more cancellation symbols into each precoding block;
   d. precoding each precoding block;
   e. concatenating the one or more precoded blocks and inserting at least one cancellation subcarrier into the concatenated precoded blocks to form a precoded Orthogonal Frequency Division Multiplexing (OFDM) symbol;
   f. processing the precoded OFDM symbol so as to reduce the out-of-band power emitted in transmitting the precoded OFDM symbol, wherein the processing uses the inserted cancellation symbols and cancellation subcarriers; and
   g. transmitting the processed precoded OFDM symbol over the wireless communication channel.

8. A wireless receiver comprising:
   a. a module configured to receive a precoded Orthogonal Frequency Division Multiplexing (OFDM) symbol over a wireless communication channel;
   b. a demultiplexer configured to partition the precoded OFDM symbol into one or more precoded blocks;

c. at least one de-precoding module, each configured to de-precode a corresponding precoded block;

d. a module configured to process the one or more de-precoded blocks so as to compensate for carrier frequency offset and phase noise, wherein the processing uses one or more pilot symbols inserted by the transmitter and one or more corresponding received pilot symbols extracted from the de-precoded blocks; and e. a module configured to extract data bits from the symbols of the carrier frequency offset- and phase noise-compensated blocks.

9. A receiver as claimed in claim 8, wherein the module configured to process the one or more de-precoded blocks is configured to:

a. compute the average conjugate product of each transmitted and received pilot symbol over a plurality of consecutive de-precoded blocks surrounding a current de-precoded block;

b. estimate a phase error at the location of each pilot symbol within the current de-precoded block using the argument of the average conjugate product;

c. estimate a phase error at all locations within the current de-precoded block by interpolation from the phase error estimate at the location of each pilot symbol; and d. compensate each symbol in the current de-precoded block for the estimated phase error at the corresponding symbol location.

10. A receiver as claimed in claim 8, wherein the de-precoding modules are configured to de-precode the respective precoded blocks using the Inverse Fast Fourier Transform.

11. A wireless communication system comprising:

a wireless transmitter comprising:

a. a module configured to modulate input data bits into data symbols according to a predetermined modulation scheme, and group the data symbols into one or more precoding blocks;

b. at least one symbol insertion module, each configured to insert one or more cancellation symbols into a corresponding precoding block;

c. at least one precoding module, each configured to precode a corresponding precoding block;

d. a subcarrier insertion module configured to concatenate the one or more precoded blocks and to insert at least one cancellation subcarrier into the concatenated precoded blocks to form a precoded Orthogonal Frequency Division Multiplexing (OFDM) symbol;

e. a module configured to process the precoded OFDM symbol so as to reduce the out-of-band power emitted by the transmitter in transmitting the precoded OFDM symbol, wherein the processing uses the inserted cancellation symbols and cancellation subcarriers; and f. a module configured to transmit the processed precoded OFDM symbol over a wireless communication channel;

and a wireless receiver as recited in claim 8.

12. A method of receiving data bits transmitted over a wireless communication channel, the method comprising:

a. receiving a precoded Orthogonal Frequency Division Multiplexing (OFDM) symbol over the wireless communication channel;

b. partitioning the precoded OFDM symbol into one or more precoded blocks;

c. de-precoding each precoded block;

d. processing the one or more de-precoded blocks so as to compensate for carrier frequency offset and phase noise, wherein the processing uses:

i. one or more pilot symbols inserted by a transmitter of the precoded OFDM symbol, and ii. one or more corresponding received pilot symbols extracted from the de-precoded blocks; and e. extracting the data bits from the symbols of the carrier frequency offset- and phase noise-compensated blocks.

* * * * *